(12) United States Patent
Linnartz et al.

(10) Patent No.: US 12,463,728 B2
(45) Date of Patent: Nov. 4, 2025

(54) ACCELERATED KEYING FOR AN OPTICAL COMMUNICATION SYSTEM

(71) Applicant: SIGNIFY HOLDING B.V., Eindhoven (NL)

(72) Inventors: Johan Paul Marie Gerard Linnartz, Eindhoven (NL); Paul Henricus Johannes Maria Van Voorthuisen, Sint Oedenrode (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 245 days.

(21) Appl. No.: 18/278,322

(22) PCT Filed: Feb. 21, 2022

(86) PCT No.: PCT/EP2022/054232
§ 371 (c)(1),
(2) Date: Aug. 22, 2023

(87) PCT Pub. No.: WO2022/184485
PCT Pub. Date: Sep. 9, 2022

(65) Prior Publication Data
US 2024/0129039 A1    Apr. 18, 2024

(30) Foreign Application Priority Data

Mar. 4, 2021  (EP) .................................... 21160601

(51) Int. Cl.
*H04B 10/516*    (2013.01)
*H04B 10/11*     (2013.01)
(52) U.S. Cl.
CPC ........... *H04B 10/516* (2013.01); *H04B 10/11* (2013.01)
(58) Field of Classification Search
None
See application file for complete search history.

(56) References Cited

U.S. PATENT DOCUMENTS

| 2009/0225065 A1 | 9/2009 | Overes |
| 2010/0026707 A1 | 2/2010 | Hoogenstraaten et al. |

(Continued)

FOREIGN PATENT DOCUMENTS

| WO | WO-2017190998 A1 * | 11/2017 | ........... H04B 10/116 |
| WO | 2020089150 A1 | 5/2020 | |

OTHER PUBLICATIONS

Karunatilaka, et al. "LED Based Indoor Visible Light Communications: State of the Art." IEEE Communication Surveys & Tutorials, vol. 17. No. 3, Third Quarter 2015. pp. 1649-1677.

*Primary Examiner* — David W Lambert

(57) ABSTRACT

This invention relates to a binary signaling scheme for use in a transmitter comprising a semiconductor radiation source where the driving current and thus also the radiation output level is modulated by switching the driving current on and off. However, the modulation of the driving current is adapted to not wait for the radiation response to follow the complete rise or fall curve but to switch between two (or a larger number of) selected radiation output levels. During prolonged sequences of zeros (or ones), the driving current is switched to keep the radiation output level between a certain minimum and maximum level. This range of radiation output levels is adaptively selected in accordance with characteristics of the driving current, the optical transmission channel, the radiation source and/or the radiation detector.

12 Claims, 5 Drawing Sheets

(56) References Cited

U.S. PATENT DOCUMENTS

| | | |
|---|---|---|
| 2010/0097408 A1 | 4/2010 | Michael Marcellinus et al. |
| 2016/0014864 A1 | 1/2016 | Aliakseyeu et al. |
| 2018/0279440 A1 | 9/2018 | Van De Sluis et al. |

* cited by examiner

ACCELERATED KEYING FOR AN OPTICAL COMMUNICATION SYSTEM

CROSS-REFERENCE TO PRIOR APPLICATIONS

This application is the U.S. National Phase application under 35 U.S.C. § 371 of International Application No. PCT/EP2022/054232, filed on Feb. 21, 2022, which claims the benefit of European Patent Application No. 21160601.7, filed on Mar. 4, 2021. These applications are hereby incorporated by reference herein.

FIELD OF THE INVENTION

The invention relates to the field of signal transmission in optical communication networks, more in particular to methods of driving a semiconductor radiation source at a transmitter, transmitters for use in an optical communication system, and optical communication systems such as—but not limited to —LiFi networks, for use in various different applications for home, office, retail, hospitality and industry.

BACKGROUND OF THE INVENTION

Optical wireless communication (OWC) systems, such as LiFi networks (named like WiFi networks), enable mobile user devices (called end points (EP) in the following) like laptops, tablets, smartphones or the like to connect wirelessly to the internet. WiFi achieves this using radio frequencies, but LiFi achieves this using the light spectrum which can enable unprecedented data transfer speed and bandwidth. Furthermore, it can be used in areas susceptible to electromagnetic interference. An important point to consider is that wireless data is required for more than just our traditional connected devices. Today, televisions, speakers, headphones, printer's, virtual reality (VR) goggles and even refrigerators use wireless data to connect and perform essential communications. Radio frequency (RF) technology like WiFi is running out of spectrum to support this digital revolution and LiFi can help power the next generation of immersive connectivity.

Based on modulations, information in the coded light can be detected using any suitable light sensor. This can be a dedicated photocell (point detector), an array of photocells possibly with a lens, reflector, diffuser of phosphor converter, or a camera comprising an array of photocells (pixels) and a lens for forming an image on the array. E.g., the light sensor may be a dedicated photocell included in a dongle which plugs into the end point, or the sensor may be a general purpose (visible or infrared light) camera of the end point or an infrared detector initially designed for instance for 3D face recognition. Either way this may enable an application running on the end point to receive data via the light.

As an example, on-off keying (OOK) is an attractive modulation method that is widely used in optical fiber systems and OWC systems based on semiconductor transmitters or emitters (such as laser diodes or light emitting diodes (LEDs). In fact, according to common understanding of communication principles, for a given power budget, the highest throughput can be achieved by a two-level modulation. This understanding is based on an interpretation of communication signals as being points in a multi-dimensional space. The use of multilevel signals demands $M=2^m$ signal levels to transfer Mbits and all these levels must be separated by some minimum distance to make the signals robust against noise. Hence, it is most energy effective to avoid the use of multiple bits per symbol. However, the use of only two bits per symbol is more demanding in terms of signal bandwidth.

International patent application WO 2017/190998 A1 discloses a light source for use in a visible light communication system, applying on-off key modulation to a data sequence to embed the data signal as an on-off keyed amplitude modulation of the data signal. To accommodate for PWM dimming D1 proposes to synchronize the data and dimming signal, and subsequently summing the PWM dimming signal and the data signal so as to generate a drive signal for an LED light source. The resulting drive signal is supplied to a LED light source, thereby embedding the data sequences within the luminous output of the light source.

Optical sources, particularly LEDs, are limited in their bandwidth. The junction capacitance acts as a low pass filter. Secondly, phosphor used in blue-photon-converting white LEDs is a cause of low-pass behavior. The same applies to detectors, particularly with wide aperture and wide opening angle, as needed in wireless optical communication. Bandwidth limitations can also occur in an optical fiber, particularly in multimode plastic optical fibers (POF). These POFs can be attractive in short haul links, such as inside a home or an apartment, or to connect wireless emitters in an office space of factory hall. In some applications such POFs are even combined with wireless optical links, by wirelessly emitting the signals that also travel over POF, possibly with an electrical or optical amplifier in between. All these effects contribute to the phenomenon that optical channels limit the bandwidth of the modulation signal.

For such limitation bandwidth reasons, todays LED-based LiFi systems often use a form of Orthogonal Frequency Division Multiplexing (OFDM) with multiple bits per symbol, which is more spectrum efficient. However, OOK with only two signal levels is more energy efficient than OFDM. Moreover, OFDM requires highly linear systems with linear power-hungry amplifiers and sophisticated signal processing.

OOK modulation has a further advantage in that the driver can be implemented with a fast on-off switch, which makes it very power efficient and compact. However, the semiconductor transmitter/emitter (e.g. LED, laser) or receiver/detector (e.g. photodiode) may cause a limitation of the available bit rate due to a small opening in the eye diagram at the receiver end, which makes detection more difficult.

Due to the physics of semiconductor light sources (such as LEDs or laser diodes), it takes a certain time to reach a steady-state low or high value of a binary driving signal. Laser diodes are faster but their rise and fall times can still be a limiting factor. If the bit rate is larger than e.g. two times the bandwidth of the semiconductor light source, intersymbol interference (ISI) occurs.

SUMMARY OF THE INVENTION

It is an object of the present invention to provide a driving scheme for modulating a semiconductor light source at an increased bit rate beyond the 3 dB bandwidth of the light source, thus deeply into a region where otherwise (without the use of measures as disclosed here) severe crosstalk occurs and/or the eye of the eye diagram would be closed. The invention aims at nonetheless ensuring that the error rate remains sufficiently low. Moreover, the invention has the objective of repairing a property of optical channels which differs from the common situation in radio frequency (RF) systems where the bandwidth of the modulation is often strictly limited to avoid spillover into adjacent channels, thus Requiring steep filters. In intensity-modulated light communication, the problem of spillover into adjacent wavelengths is often not a dominant design criterion, and in this it differs from RF. However, for optical communications, particularly if using LEDs, the above mentioned low pass filtering mechanism results in a relatively gentle roll off above a certain frequency and the bandwidth above the 3 dB attenuation frequency can thus still be exploited for communication. It is therefore proposed to use modulation frequencies significantly above the 3 dB bandwidth to achieve better throughputs in OWC.

This object is achieved by a transmitter as claimed in claim 1, by an optical communication system as claimed in claim 9, by a method as claimed in claim 11, and by a computer program product as claimed in claim 12.

According to a first aspect, a transmitter is provided for generating a radiation signal in an optical communication system, the transmitter comprising an apparatus for driving a semiconductor radiation source, the apparatus comprising:
 a modulator configured to modulate a driving signal supplied to the radiation source with a data sequence to generate at least two levels of a driving current through the radiation source that define a radiation output range of the radiation source between an upper radiation output level and a lower radiation output level during transmission of the data sequence; and
 a controller configured to determine a transmission quality of the radiation output at the transmitter using at least one of: a feedback signal indicative of the radiation output level of the radiation source and a feedback information received from a receiving end of the radiation output; determine an upper target level and a lower target level defining a reduced radiation output range based on the transmission quality of the radiation output; and adaptively control the modulator to control the driving current and switch the driving current at a timing determined by the reduced radiation output range between a predetermined upper target level and a predetermined lower target level.

The reduction of the radiation output range could be achieved by not letting the radiation source reach a steady state, but rather by switching the current intentionally to avoid reaching a steady state.

According to a second aspect, a method of driving a semiconductor radiation source at a transmitter is provided for generating a radiation signal in an optical communication system, the method comprising:
 modulating a driving signal supplied to the radiation source with a data sequence to generate at least two levels of a driving current through the radiation source that defines a radiation output range of the radiation source between an upper radiation output level and a lower radiation output level during transmission of the data sequence;
 determining a transmission quality of the radiation output at the transmitter, using at least one of a feedback information received from a receiving end of the radiation output and a feedback signal indicative of the radiation output level of the radiation source;
 determining an upper target level and a lower target level defining a reduce radiation output range based on the transmission quality of the radiation output; and
 adaptively controlling the driving current and switching the driving current at a timing determined by a reduced radiation output range between a upper target level and a lower target level.

Accordingly, the proposed driving scheme works as a pre-compensation for handling limited bandwidth of the transmitter side due to a low-pass filtering effect of the semiconductor radiation source. This is achieved by driving the semiconductor radiation source with a higher driving current than would be needed to reach an intended radiation level, but at a limited swing or range of radiation output by lowering the higher limit and/or raising the lower limit of the effectively used radiation output values. The semiconductor radiation source can thus be driven within a maximum and/or minimum (possibly even negative) driving current while its radiation output is modulated with a limited current range which is a subrange of the total operating range of the semiconductor radiation source.

In general, the data sequence used to generate the at least two levels of a driving current will be a binary data sequence, although the aspects are not limited thereto.

The driving current in turn may be controlled by means of a voltage control or current control mechanism. Preferably the driving current used is the minimum/maximum drive current rating of the radiation source but may be, when possible, in excess thereof. In the latter case precautions may be required to prevent damage to the radiation source. As the pulses applied to the radiation source will be of a short duration on account of the modulation speed, generally faster than 1 MHz, and in view of the reduced radiation output range, driver currents exceeding the minimum/maximum drive current rating may be feasible without damaging the radiation source.

Accordingly, this approach allows fast modulation by driving the semiconductor light source between selected discrete radiation output levels of the subrange. The subrange can be chosen to be in a steeper slope range of the response of the semiconductor radiation source to a drive pulse, thereby asymmetry in the rising and falling slopes may be reduced. Moreover, a higher current can be used to drive the semiconductor radiation source faster on account of the reduced radiation output range, while the bit duration can be set to be equal to the time it takes to reach an output level adequate to distinguish the logical states in the output signal. When that point is reached the next bit time can start. So, in fact an alternating sequence of binary values (e.g. zeros and ones) determines the achievable bit rate. For other sequences with more than one successive binary value the driving current can be controlled to maintain predefined range-limited radiation output levels. Maintaining the (on or off) driving current might push the radiation output level out of its range, thus hampering the ability of the system to timely reach the target radiation output level that corresponds to an altered symbol (bit) value. The latter corresponds to inter-symbol interference. For instance, during a sustained logical one, the driver can toggle the current in an on/off pattern to ensure that the radiation output level stays near its range-limited value.

The transmission quality of the radiation output may be determined based on a feedback information received from a receiving end of the radiation output. Thus, the upper and lower target level of the radiation output can be controlled via the driving signal based on the actual reception situation at the receiving side.

At least one of a rate for the driving signal and an allowable maximum and/or minimum output radiation level or output light range for the radiation source may be determined based on the transmission quality. Thereby, the transmission speed of the radiation source can be adapted to the transmission quality of the radiation channel. E.g., if the transmission quality is increased (noise level reduced), an indication that channel transfer function is favorable, the distance (range) between the allowable maximum and minimum output radiation levels (upper and lower target levels) can be reduced (smaller eye opening) so that the target levels will be reached faster and the switching rate (i.e. bit rate) of the increased driving current will be increased, and vice versa. Conversely when the transmission quality decreases below a threshold value the reduced range may be extended, resulting in a lower speeds, but with an improved transmission quality.

Alternatively, a feedback signal that indicates a radiation output level of the radiation source or other transmission quality indication can be received at the modulator and switching of the driving signal can be controlled based on the feedback signal. This allows direct adjustment of the switching time of the driving signal in response to the radiation output level of the radiation source or other transmission quality indication.

The capacitance of the semiconductor radiation source does not need to be completely discharged as a compromise between achieving a higher transmission quality and being able to reach that the lower output level in a shorter time period. Thereby, the semiconductor light source can be modulated at an increased bit rate beyond a region where severe crosstalk occurs and/or the eye of the eye diagram is closed, while the error rate remains sufficiently low.

It is envisaged that transmission quality of the radiation output may be established using various approaches. For example, a measure/metric of transmission quality may be determined locally at the transmitter side, thus explicitly taking into account the transmitter output characteristic(s), but not the channel transfer characteristics. This may be sufficient as the assessment of quality and the determination of the reduced range may take into account known constraints the optical channel such as the typical communication distance, and/or known characteristics of the optical front-end used (output and/or input). Alternatively, a measure/metric of transmission quality may be determined at a receiver-side, thereby explicitly incorporating the channel transfer function. Monitoring the transmission quality at the transmitter side, may involve analysis of the radiation output level of the radiation source. A basic approach would be to monitor the voltage over the radiation source, in particular at the intended sampling moments. This voltage, given the known reduced output range, may provide a good quality feedback. The voltage over the semiconductor radiation source is an indicator of the junction charge of the radiation source and thus an indicator of the radiation output level. More advanced approaches may attempt to further characterize deviations of the voltage curve of a symbol from a desired output curve for that symbol and use this as a quality measure/metric, so as to also take voltage levels outside the sampling moments into consideration. In addition, various options for establishing a measure/metric of transmission quality at the receiver side are described in options hereinbelow.

It is noted that the proposed driving scheme also works well for transmission over optical fibers (e.g. polymer optical fibers (POFs)) which allow small and thus fast detectors and where transmitter limitations are relevant. Thereby, higher bit rates can be achieved for semiconductor light sources (e.g. LEDs) over optical fibers as well.

According to a third aspect, an optical communication system comprising a transmitter according to the third aspect and a receiver for receiving the radiation signal generated by the transmitter is provided.

According to a fourth aspect, a computer program product is provided, which comprises code means for producing the steps of the above method of the second aspect when run on a controller device.

According to a first option of any of the first to fourth aspects, the upper target level and the lower target level may be maintained by switching the driving signal at a higher rate than the rate of the data sequence, which in case the data sequence is a binary data sequence would translate to a bit rate.

According to a second option of any of the first to fourth aspects, which can be combined with the first option, the data sequence is a binary data sequence, and a binary switching pattern may be applied as the driving signal during a bit duration of the binary data sequence, wherein the binary switching pattern is determined by a combination of a current bit value and at least one previous bit value of the binary data sequence. Thereby, the driving signal can be switched at a sub-bit timing to ensure that the upper and lower levels of the radiation output and thus the range of the radiation output can be maintained.

According to a third option of any of the first to fourth aspects, which can be combined with any one of the first to second options, when the transmission quality of the radiation output is based on the feedback signal, the feedback signal may be compared with a lower reversal limit and an upper reversal limit and the driving signal may be switched off when the feedback signal has reached the upper reversal limit and/or switched on when the feedback signal has reached the lower reversal limit.

According to a fourth option of any of the first to fourth aspects, which can be combined with any one of the first to third options, a short-circuit or a negative driving current may be applied to the radiation source during an off-state of the driving signal. Thereby, the fall time of the radiation output from the upper level to the lower level can be increased.

According to a fifth option of any of the first to fourth aspects, which can be combined with any one of the first to fourth options, wherein the data sequence is a binary data sequence, and sub-bit periods or patterns of a different logical value (e.g. second binary state and/or idle state (tristate current)) than a current logical value of the binary data sequence may be inserted into the driving signal to achieve the upper target level or the lower target level. This measure ensures that the radiation output can be pro-actively corrected to ensure a proper level at the sampling moment.

According to a sixth option of any of the first to fourth aspects, which can be combined with any one of the first to fifth options, the upper target level or the lower target level may be selected such that a rise time of the radiation output from the lower radiation output level to the upper radiation output level equals a fall time of the radiation output from the upper radiation output level to the lower radiation output level. Thereby, a steady state of the radiation output levels can be ensured when the logical values are equally distributed in the binary data sequence.

According to a seventh option of any of the first to fourth aspects, which can be combined with any one of the first to sixth options, the driving signal may be modulated to generate more than two radiation output levels, wherein transitions in a trellis of a multi-level driving mode are adapted to rise and fall curves of the radiation source. Thereby, a trellis-based multi-level transmission system can be provided, where the bitrate is adjusted based on the transmission quality.

It is noted that the above apparatuses may be implemented based on discrete hardware circuitries with discrete hardware components, integrated chips, or arrangements of chip modules, or based on signal processing devices or chips controlled by software routines or programs stored in memories, written on a computer readable media, or downloaded from a network, such as the Internet.

It shall be understood that the transmitter of claim 1, the optical communication system of claim 9, the method of claim 11, and the computer program product of claim 12 may have similar and/or identical preferred embodiments, in particular, as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

BRIEF DESCRIPTION OF THE DRAWINGS

In the following drawings.

DETAILED DESCRIPTION OF EMBODIMENTS

Various embodiments of the present invention are now described based on an optical wireless illumination and communication (LiFi) system with multi-transceiver access device. Although the present invention is particularly advantageous within the context of an illumination system, the invention is not limited thereto and may also be used within an optical wireless communication system that is not integrated within an illumination system or within a fiber-based optical communication system.

Throughout the following, a light source may be understood as a radiation source that generates visible or non-visible light (i.e., including infrared (IR) or ultraviolet (UV)) light sources) for communication purposes. The light source may be included in a luminaire, such as a recessed or surface-mounted incandescent, fluorescent or other electric-discharge luminaires. Luminaires can also be of the non-traditional type, such as fiber optics with the light source at one location and the fiber core or "light pipe" at another. The concepts can also be used in peer-to-peer communication between smartphones or Internet of Things (IoT) devices.

It is further noted that when using optical wireless communication based on invisible parts of the light spectrum, such as infrared and/or or ultraviolet, the system can be fully decoupled from any illumination systems. In such scenarios the optical wireless communications systems may function to primarily provide communication and a separate transceiver node may be used in the optical wireless communication system. Alternatively, such optical wireless communication systems may be complementary to a further function and thus be integrated in other application devices that benefit from such communication functionality; such as personal computers, personal digital assistants, tablet computers, mobile phones, televisions, etc.

Conventional light source luminaires are rapidly being replaced by light emitting diode (LED) or laser-based lighting solutions. In LiFi systems, more advanced LED or laser-based luminaires are enabled to act as LiFi communications hub to add LiFi connectivity to lighting infrastructure. The underlying idea is that an illumination infrastructure is positioned in such a manner that it provides a line of sight from the luminaire to locations where people tend to reside. As a result, the illumination infrastructure is also well positioned to provide optical wireless communication that likewise requires line of sight.

According to various embodiments, an adaptive or accelerated on-off keying (OOK) scheme for such LiFi systems or other optical communication systems is provided to accelerate the transmission rate while keeping the driver or driving circuit simple and power efficient.

Figure 1:
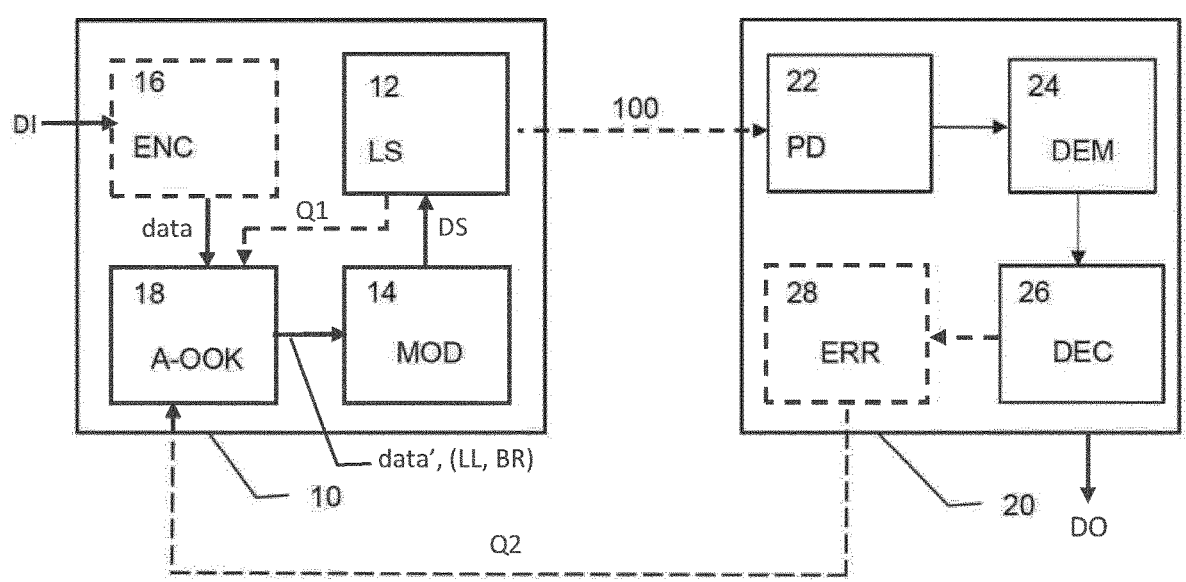
FIG. 1 shows schematically a block diagram of an optical communication system according to various embodiments.

FIG. 1 shows schematically a block diagram of an optical communication system according to various embodiments.

It is noted that—throughout the present disclosure—only those structural elements and functions are shown, which are useful to understand the embodiments. Other structural elements and functions are omitted for brevity reasons.

The optical communication system of FIG. 1 may correspond to a communication link of a LiFi network comprises a transmitter (optical emitter) 10 (e.g. an access point (AP) with a luminaire of a lighting system) connected via an optical channel (e.g. an optical free-space link) to a receiver (light detector) 20. A respective light output 100 (e.g. light beam) generated by a light source (LS) 12 of the transmitter 10 is received by a photo detector (PD) 22 of the receiver 20. The light source 12 may comprise a radiation emitting element (e.g. LED or laser diode) and the photo detector 22 may comprise a radiation detecting element.

The transmitter 10 depicted here comprises an encoder (ENC) 16 for encoding input data DI received via an interface circuit (not shown) to obtain a binary data sequence data which here consists of a sequence of binary values "0" and "1" according to a selected binary encoding scheme. As exemplified by the dashed outline of the encoder ENC, such encoder may also be external to the transmitter. The binary data sequence data is supplied to an adaptive OOK controller (A-OOK) 18 which controls the modulator circuit (e.g. switching circuit) 14 to generate a driving signal DS (e.g. driving current or voltage) in accordance with the proposed enhanced driving scheme and supply it to the light source 12 to generate the light output 100 with accelerated OOK or other keying-based modulation scheme. More specifically, the adaptive OOK controller 18 may be configured to determine at least one of a switching time or rate (e.g. bit rate BR) for the driving signal DS. In one implementation, the adaptive OOK controller 18 provides an amplitude and timing adjusted data sequence data' to the modulator circuit 14, wherein the modulator circuit essentially is the radiation source driver. However, alternatively the adaptive OOK controller may also pass the data sequence and an allowable maximum and minimum light output level LL or output light range for the light source 12, thus offloading the more timing critical operations to the modulator.

Meanwhile the maximum and minimum light output levels, or reduced radiation output range are based on a transmission quality information provided to the controller 18. The transmission quality feedback may, as discussed above, be determined solely inside the transmitter 10 and may for example. Be derived from the voltage over the semiconductor radiation source LS, in FIG. 1, the quality feedback Q1. Alternatively, and/or additionally, it may be based on quality feedback Q2 fed back from the receiver 20.

For example, assuming the implementation using LL and BR, when the transmission quality increases, the driving signal DS and thus the drive current can be switched at a higher rate (increased bit rate) to reduce the distance between the maximum and minimum light output levels or the allowable maximum and minimum light output levels are set to be closer together so that the drive signal is switched at a higher rate.

Moreover, the light source 12 may be configured to provide a feedback signal Q1 that indicates the light output level or a property or parameter related to light level to the modulator circuit 14, which uses the feedback signal Q1 together with the switching time/rate and/or maximum/minimum light level or light range to generate or control the driving signal DS and apply it to the light source 12. Based on the feedback signal Q1 and the control information (BR, LL), the modulator circuit 14 adjusts the driving signal DS to control the range and/or level of the driving current of the light source 12 and thus the light output 100 in accordance with the proposed accelerated keying-based modulation scheme (e.g. accelerated OOK).

In an example, the modulator circuit 14 (i.e. modulator driver) may act as a switching device controls the driving signal DS to switch the driving current through (or voltage across) the light source 12 (e.g. an optical emitter) between a number of discrete values (e.g. 2 or 4 discrete values).

At the receiver 20, the output signal of the photo detector 22 may be supplied to a demodulator circuit (DEM) 24 where it is demodulated by detecting or discriminating light output levels to obtain a binary data sequence. This binary data sequency may then be decoded in a decoder circuit (DEC) 26 to obtain output data which should correspond to the original input data (i.e. original binary data sequence) DI supplied the transmitter 10. Then, an error detection circuit (ERR) 28 may check the output data based on an error detection scheme (e.g. parity checking, cyclic redundancy check (CRC), error correction coding etc.) to determine a transmission quality (e.g. signal-to-noise ratio) of the optical transmission. The checking result may optionally be fed back from the receiver 20 to the transmitter 10 via an optical or other wireless channel as the transmission quality information used by the adaptive OOK controller 18.

In an example, a control software may be running on a central processing unit (CPU) provided in the adaptive OOK controller 18 and/or the receiver 20 to provide the controller and receiver functions discussed herein.

Being a semiconductor device (e.g. LED or laser), the physical properties of the light source 12 cause the optical output 100 to become a low pass filtered version of the driving current. More specifically, a junction of a semiconductor light source is a capacitance and discharging of that capacitance by means of hole-electron pairs that recombine into photons is a nonlinear function of the charge. Particularly, when the capacitance is in a state of low charge, not many photons are created such that discharging gets slower and slower. If the (Nyquist) bandwidth of the symbol rate of the driving signal DS is larger than the 3 dB bandwidth of the light source, then ISI would occur without further measures. However, the switching time/rate (e.g. bit rate (BR)) of the light source 12, which corresponds to the time resolution of on-off switching, can be selected by the adaptive OOK controller 18 to be faster than the symbol rate or to occur at other (later or earlier) instances than the bit transition. As a result, it can be facilitated that the light output reaches the light level target value at the sampling instant.

According to various embodiments, an on-state of the driving current for switching on the light source is made intentionally larger than the driving current that leads to a desired steady state light output. Additionally, an off-state of the driving current for switching off the light source 12 may not be a zero current (i.e. a disconnection of the driving current from the current source).

In an example, during the off-state of the driving current, the light source 12 may be short-circuited to achieve faster discharging the light source 12. Thereby, a "higher-than-needed" on-current and a "short-circuited" light source 12 during an off period can be combined to achieve an accelerated OOK.

Figure 2:
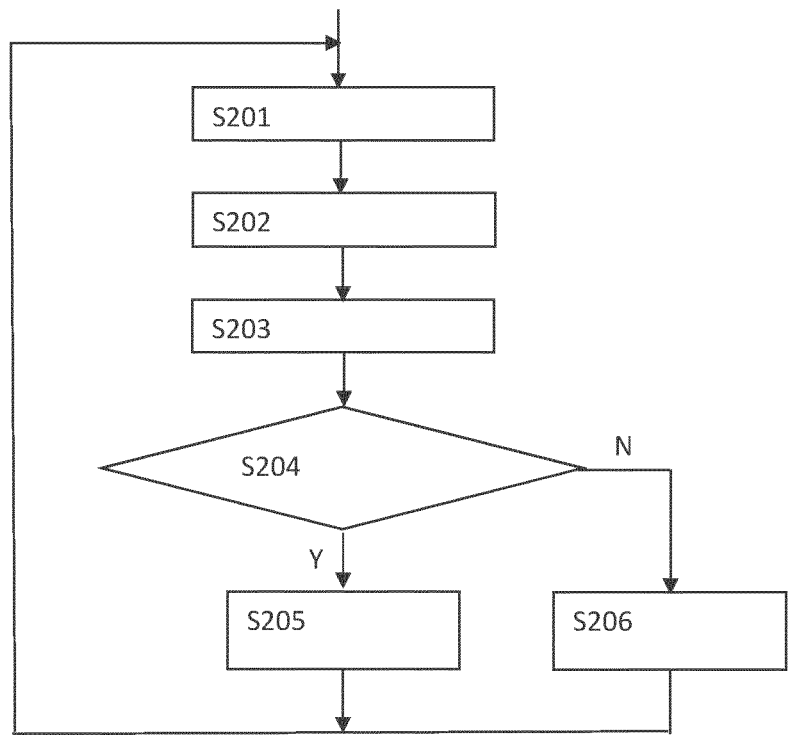
FIG. 2 shows a flow diagram of driving procedure according to various embodiments.

In another example, an intentional negative driving current may be applied as off-current during an off period of the light source ("active sweep out"). This could be achieved e.g. by a transistor with a source-drain or collector-emitter connection across the light source. Such sweep-out current can be applied to faster reach the light output level that corresponds to a logical zero. However, for multiple successive zeros, it may not be attractive to fully deplete the junction. In such case, the recovery to a charged junction state (needed to transmit a logical one) would be excessively long. Thus, measures are taken to ensure that, after a rapid sweep out during the first zero, the junction of the light source 12 stays lightly charged during following zeros. This can be done by injecting short bursts of on-currents. FIG. 2 shows a flow diagram of driving procedure according to various embodiments which may be implemented in the adaptive OOK controller 18 of FIG. 1.

In a first step S201, transmission quality (e.g. quality of service (QoS), signal-to-noise ratio (SNR), bit error rate (BER), symbol error rate (SER) etc.) of the optical channel is determined, e.g., based on transmitter-side measurements or feedback information from the receiver side). Then, in step S202, a bit rate and/or a range of light output levels (or maximum and/or minimum light output levels) for driving the transmitter light source are determined (e.g. stepwise increased or decreased) based on the determined transmission properties and used for modulating the transmitter light source.

In step S203, the current binary data sequence or pattern to be used for modulating the transmitter light source is monitored. If it is it is determined in subsequent step S204 that the monitored data sequence includes multiple successive levels of same binary value (e.g. a sequency of two or more "0"-values or a sequency of two or more "1"-values), then the procedure continues with step S205 where the modulation or switching bit rate for the transmitter light source is increased by a predetermined amount and a predetermined sub-bit pattern is incorporated during the multiple successive levels of same binary value) to keep the light output level at the determined maximum or minimum light output. Otherwise, if no multiple successive levels of same binary values if included in the current binary data sequency or pattern, the procedure branches to step S206 where the transmitter light source is driven with predetermined bit rate determined in step S202.

Finally, the procedure jumps back to the initial step S201 and continues so long as data is available for transmission.

In a practical system, steps S203 to S206 may run at very high speed (e.g. hundreds of Megabits per second) and may therefore be implemented in hardware. The adaptation of the bit rate in steps S201 and S202 can be done slowly (e.g. at speeds around one or a few seconds) and in response to changes in the channel (for instance by motion of the client device(s)). Moreover, such bit rate adaptation may require protocol overhead to align the transmitter side and receiver side which may be in (embedded) software and may be done every few (hundreds) of milliseconds. Hence, the level switching loop and the adaptive bit rate control may be separated in different processing flows.

Figure 3:
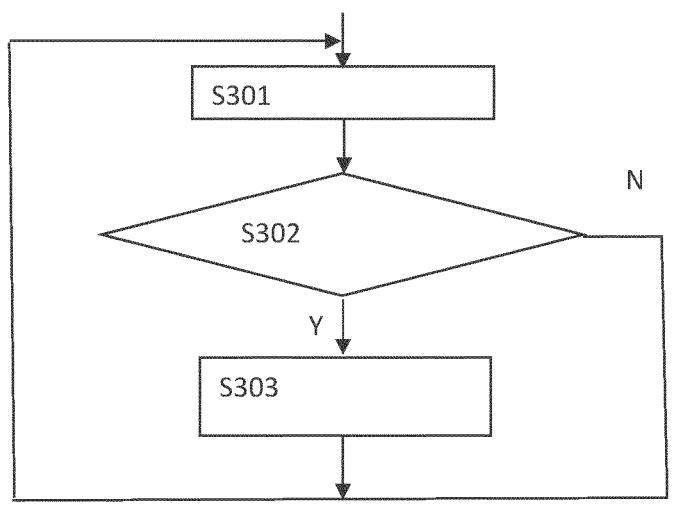
FIG. 3 shows a flow diagram of a receiver feedback procedure according to various embodiments.

In another embodiment, in the procedure of FIG. 2 may be refined to implement a tristate driver with a first state during which a first current (e.g. positive current) is supplied to pull up the charge in the transmitter light source, a second state during which a second current (e.g. negative current) is supplied to sweep-out the charge from the transmitter light source, and a third (idle) state during which no current flows. The idle state can facilitate the emission of multiple successive logical zeros (or logical ones), during which the junction of the transmitter light source tends to slowly discharge due to (photonic and non-radiative) hole-electron recombination, such that only a short burst of a positive current may be needed during sub-bit intervals. Rapid alternating of such positive current bursts with a negative current may cause excessive waste of energy while alternating with a positive current and an idle state is more energy efficient. Thus, such a tri-state operation may involve a high positive current used to pull up the charge in the transmitter light source during transitions to a higher light output level. Negative sweep-out currents may be used to accelerate the transitions to lower light output levels. The idle (zero current) mode may be used when no small changes in light output level are expected. The idle state may be alternated with a short positive burst to (re-)charge the junction of the transmitter light source. FIG. 3 shows a flow diagram of receiver feedback procedure according to various embodiments where the transmission quality information is fed back from the receiver side to the transmitter side.

In step S301, the received data sequence (e.g. after decoding or demodulating) is evaluated to determine transmission quality (e.g. signal-to-noise ratio (SNR), bit error rate (BER), symbol error rate (SER) etc.) of the optical channel. Then, in step S302, it is checked whether a predetermined threshold value of at least one transmission quality parameter (e.g. signal-to-noise ratio (SNR), bit error rate (BER), symbol error rate (SER) etc.) has been exceeded. If so, the procedure continues at step S303 where a request to reduce the bitrate is fed back to the receiver side, e.g., via an optical channel or an RF channel (NFC, Bluetooth, WiFi etc.). Otherwise, if the threshold value is not exceeded, the procedure jumps back to step S301 and continues as long as the transmission is ongoing.

As an alternative, it could be checked in step S302 whether the threshold values is not exceeded and the feedback information signaled in step S303 could be a request to maintain the bit rate, while the request to reduce the bit rate could be signaled otherwise.

Thus, according to various embodiments, the full range of light levels available for OOK or other keying modulation is restricted to a reduced swing or range of the light output level determined by the minimum and/or maximum light output level, such that the light output levels can still be discriminated at the receiver side, although the eye diagram opening is smaller due to the filtering characteristic of the transmitter light source at selected higher bit rates.

Furthermore, in case of 0-to-0 and 1-to-1 bit transitions due to multiple successive levels of same binary values, "sub-bit" on-off switching at an increased bit rate ("fiddling") can be introduced to sustain the light level (rather than to let it sink or rise further). This reduces the ISI. Although this measure may reduce the distance between the maximum and minimum light output levels to some extent, it provides the advantage of increased ISI-free bit rates (i.e. increased transmission speed) when the transmission quality is sufficiently high.

In an embodiment, the modulator (e.g. controller 18 and/or modulator circuit 14 in FIG. 1) makes use of known properties of the low-pass characteristic of the transmitter light source (e.g. light source 12 in FIG. 1) by switching the light source in a such way that at particular sampling moments, the optical output signal reaches one of multiple discrete light output levels (e.g. the determined maximum and minimum light output values in case of a two-level system).

In an example, the modulator may use a timing advance or timing delay in the switching operation to target the desired light output levels. Within the interval transmitting the symbol (e.g. a logical "0"), the modulator may insert sub-bit periods or patterns of a different logical value than that of the current symbol (e.g. current-on/off), to achieve a desired light output level of the transmitter light source at a sampling moment.

In another embodiment directed to optimized light output levels, the modulator (e.g. controller 18 and/or modulator circuit 14 of FIG. 1) may achieve a desired low light output level $\phi 0$ and a desired high light output level $\phi 1$ such that the light output levels $\phi 0$ and $\phi 1$ can be detected by the receiver as representing a logical level "0" and "1", respectively, that the light output level $\phi 0$ for the logical value "0" is strictly positive and higher than a steady state light output level when the driving current is continuously switched to its lowest value, and that the light output level $\phi 1$ for the logical value "1" is smaller than a steady state light output level that would correspond to a driving current being continuously switched on.

In an example, the selection of the output light $\phi 0$ and $\phi 1$ may be optimized such that the rise time from $\phi 0$ to $\phi 1$ is equal to the fall time from $\phi 1$ to $\phi 0$ (with the off-current starting at f1). E.g., for two successive logical values "0", the modulator may ensure that the light output level of the transmitter light source equals $\phi 0$ at corresponding two successive sample moments t1 and t2, e.g., by applying the on and off-current during fractions (sub-bit periods) of the interval between the sample moments t1 and t2. Similarly, for two successive logical values "1", the modulator may ensure that the light output level of the transmitter light source equals $\phi 1$ at corresponding two successive sample moments t1 and t2, e.g., by applying the on and off-current during fractions (sub-bit periods) of the interval between the sample moments t1 and t2.

Figure 4:
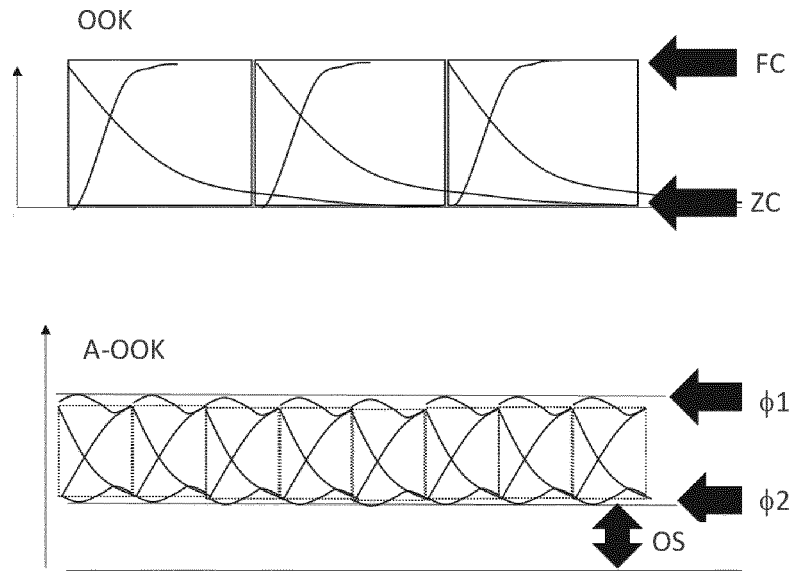
FIG. 4 shows schematically waveform diagrams of light responses for different switching speeds according to various embodiments.

FIG. 4 shows schematically waveform diagrams of a light output (light response) of the transmitter light source as a function of time for normal OOK and accelerated OOK (A-OOK) for different switching speeds according to various embodiments.

In response to switching on and off the driving current supplied to the transmitter light source (e.g. LED), different rise and fall characteristics with different rise and fall times are observed. The upper waveform of FIG. 4 shows a typical OOK waveform at a rate below the bandwidth of the transmitter light source, where sufficient time is available for the light source current and thus the light output level to reach the zero state (i.e. zero driving current (ZC) or off-current) and to reach the full light output level when the full driving current (FC) or on-current is applied.

Additionally, the lower waveform of FIG. 4 shows an output light waveform for the proposed A-OOK driving that limits the level swing or range in light output and allows faster modulation. Due to the increased bit rate beyond the bandwidth of the transmitter light source, the time available for the light source current and thus the light output level is no longer sufficient to reach the zero light output level and the full light output level, respectively. As a result, the light output varies between a minimum light output level $\phi 0$ larger than zero and a maximum light output level $\phi 1$ lower than the maximum level of the OOK waveform (upper diagram of FIG. 4), so that an offset level OS of the light output is obtained. Thus, the A-OOK driving scheme (e.g. switching time/rate, maximum and/or minimum light output level) is controlled based on the transmission quality of the optical channel to allow discrimination of the logical output levels at the receiver at an increased bit rate.

Figure 5:
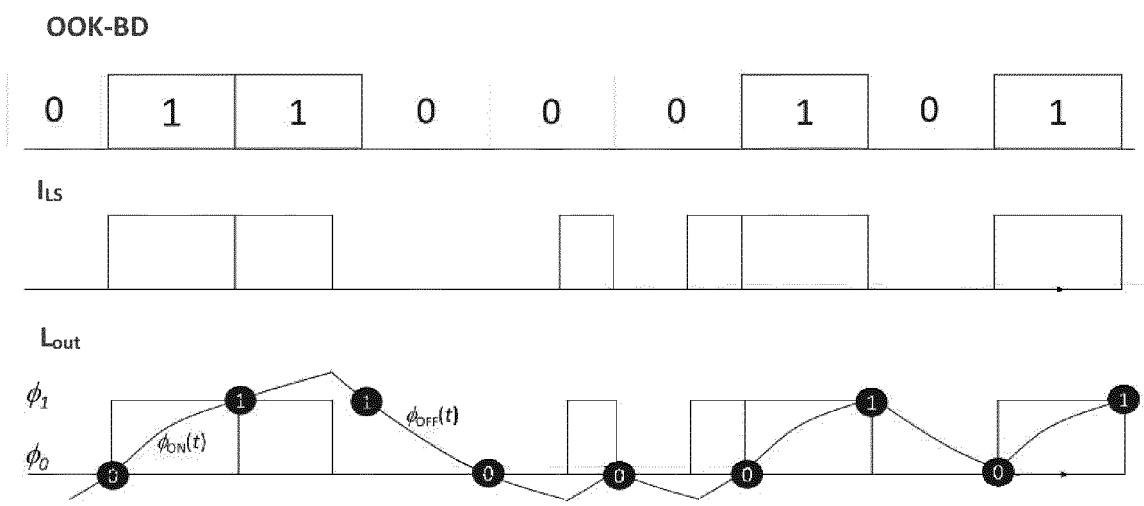
FIG. 5 shows schematically respective waveform diagrams of a binary data sequence, a light source current and a resulting light output according to various embodiments.

FIG. 5 shows schematically waveform diagrams of a binary data sequence, a light source current light and a light output according to various embodiments.

The upper waveform indicates a binary data sequence (OOK-BD) with normal OOK modulation used for driving the transmitter light source, as a function of time.

Furthermore, the middle waveform shows the driving current ($I_{LS}$) supplied to the transmitter light source after processing by the modulator (e.g. controller 18 and/or modulator circuit 14 of FIG. 1) in accordance with the proposed A-OOK mode, as a function of time.

Finally, the lower waveforms show the light output ($L_{out}$) of the transmitter light source (curvy lines) and the binary driving current as a function of time caused by on-off periods (bit rates) that differ from the typical OOK symbol timings. The symbol value is reached at and indicated in the dark circles. Here, levels $\phi 0$ and $\phi 1$ represent the target light output values for a logical zero and one, respectively, which are to be reached at sampling instants. However, at any other instance a possible deviation outside the sampling moments is constrained to ensure that the correct light output levels can be reached timely at the sampling moments.

As can be gathered from the middle and lower waveforms of FIG. 5, 1-to-1 transitions of the binary data sequence are modified by shortening the second time period of the on-current to sustain the maximum light output level $\phi 1$. Additionally, 0-to-0 transitions of the binary data sequence are modified by adding an intermediate on-current of a shortened (i.e. sub-bit) time period to sustain the minimum light output level $\phi 0$.

The on-off switching of the driving current of the transmitter light source is chosen in the A-OOK driving mode such that a particularly, intentionally selected maximum and/or minimum light output level is reached at the sampling time. In an example, the on-off pattern of the driving current does not necessarily follow the binary pattern of the binary data sequence, particularly not during many successive bits of the same value.

In a first example of the A-OOK driving mode, the intentionally selected maximum and/or minimum light output level can be reached or kept by changing the time instances at which the driving current is switched on of or off to a sub-bit timing.

In a second example of the A-OOK driving mode, the intentionally selected maximum and/or minimum light output level can be reached or kept e.g. during a "011" bit sequence by maintaining the current in an on-state after the first binary value "1" for a sub-bit period that is a predetermined fraction of the bit duration, but then switching off the driving current before the transmission interval of the second binary value "1" ends (delaying approach).

In a third example of the A-OOK driving mode, the intentionally selected maximum and/or minimum light output level can be reached or kept e.g. during a "001" bit sequence by switching on the driving current before the start of the transmission interval of the binary value "1" to ensure that the two successive binary values "0" are both received at the same minimum light output level (time-advancing approach).

In a fourth example of the A-OOK driving mode, the intentionally selected maximum and/or minimum light output level can be reached or kept e.g. during runs of multiple successive bits of the same binary value by inserting short on- or off-periods of the driving current, respectively.

In a fifth example of the A-OOK driving mode, the intentionally selected maximum and/or minimum light output level can be reached or kept e.g. during a "000" bit sequence by inserting a short sub-bit on-period of the driving current to maintain a minimum light output level.

Figure 6:
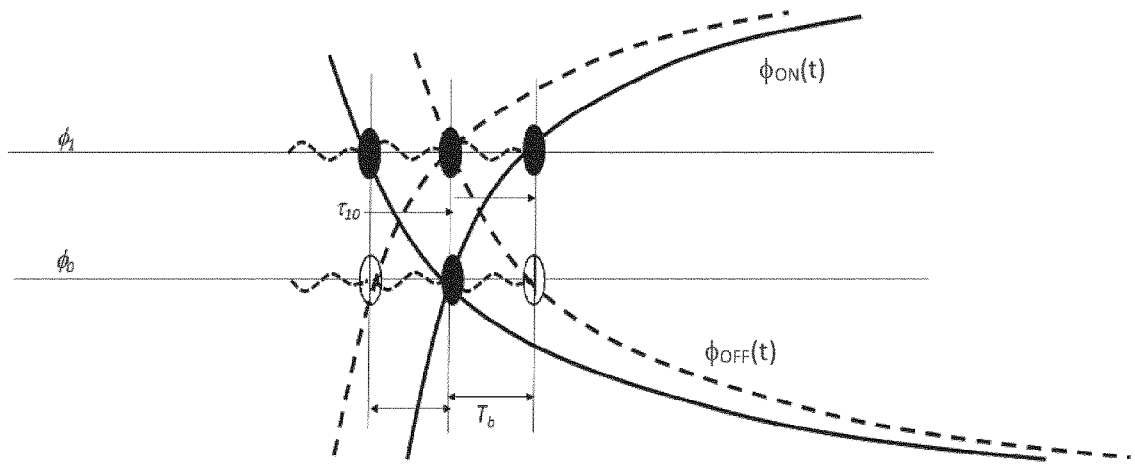
FIG. 6 shows schematically waveform diagrams for switching between logical states of the light output according to various embodiments.

FIG. 6 shows schematically waveform diagrams for switching between logical states of the light output as a function of time, according to various embodiments.

More specifically, switching between a "logical one" light output level $\phi 1$ and "logical zero" light output level $\phi 0$ is shown in FIG. 6, following the rise curve $\phi_{ON}(t)$ and fall curve $\phi_{OFF}(t)$, for a "01" and "10" transition of the binary data sequency, respectively. As can be gathered from FIG. 6, a toggle period between on- and off-states of the driving current can be determined to sustain desired minimum and maximum light output levels $\phi 0$ and $\phi 1$ and their deviations during "00" and "11" transitions in dependence on the bit period or duration $T_b$. ISI-free transmission of the binary data sequency from the transmitter to the receiver can be achieved if the bit duration $T_b$ (i.e. the inverse value of the bit rate) exceeds both the time interval needed for the transmitter light source to reach $\phi 1$ when starting from $\phi 0$ and the time interval needed for the transmitter light source to reach $\phi 0$ when starting from $\phi 1$.

The off-state of the driving current may also be a state of short circuiting the transmitter light source. Similarly, in an implementation, the on-state of the driving current may be a predetermined voltage level required to power up the transmitter light source with a predetermined rise time.

Figure 7:
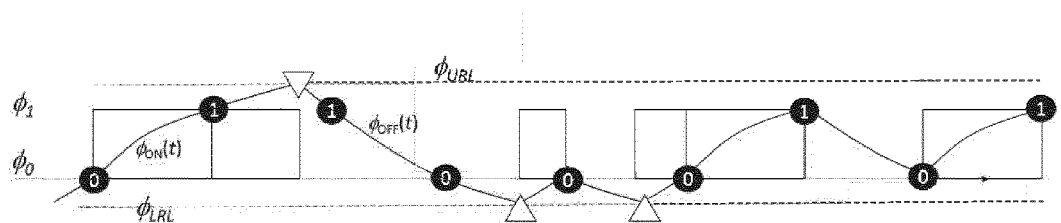
FIG. 7 shows schematically waveform diagrams of a light source current and a resulting light output according to various embodiments.

FIG. 7 shows schematically waveform diagrams of a light source current and a resulting light output as a function of time, according to various embodiments.

In this example, a lower reversal limit $\phi_{LRL}$ and an upper reversal limit $\phi_{URL}$ are used as direct feedback when the light output is monitored. As indicated by the triangles "Δ" in FIG. 7, whenever the modulator (e.g. controller 18 and/or modulator circuit 14 in FIG. 1) determines that the value of the light output level 4 as determined by the rise curve $\phi_{ON}(t)$ or the fall curve $\phi_{OFF}(t)$ reaches the lower reversal limit $\phi_{LRL}$ or an upper reversal limit $\phi_{URL}$, respectively, the driving current is switched on or off, respectively, to obtain the desired maximum light output level $\phi 1$ or minimum light output level $\phi 0$ at the sampling moment, as indicated by the black circles in FIG. 7.

Thus, the upper and lower reversal limits are threshold levels which when exceeded trigger or toggle the driver to switch driving current to another state (e.g. opposite logical state or idle state), so as to not exceed the reversal limits. The reversal limits can be set based on the rise and fall curves to obtain the desired maximum light output level $\phi 1$ or minimum light output level $\phi 0$ at the sampling moment. More specifically, when the driving current is in the on-state and the rising light output level reaches the upper reversal limit $\phi_{URL}$, the driving current is switched off (upper triangle in the waveform of FIG. 7). On the other hand, when the driving current is in the off-state and the falling light output level reaches the lower reversal limit $\phi_{LRL}$, the driving current is switched on.

Figure 8:
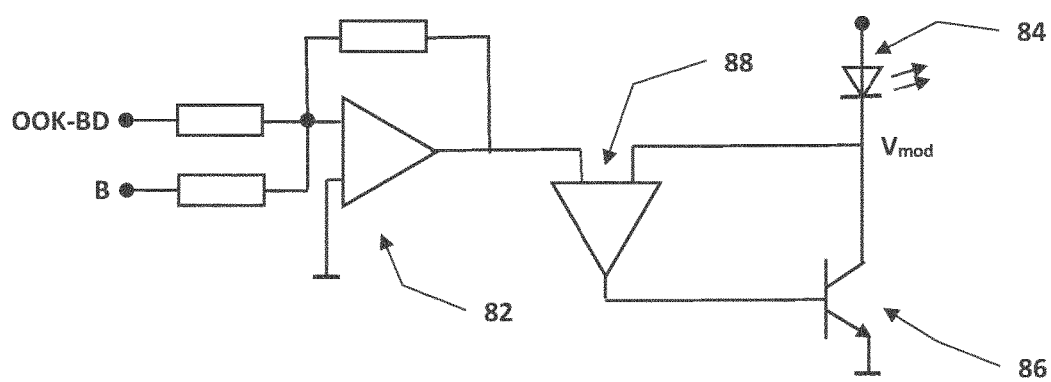
FIG. 8 shows schematically a circuit diagram of a driver with a light output feedback according to an embodiment.

FIG. 8 shows schematically a circuit diagram of a driver with a light output feedback according to an embodiment.

In the exemplary circuit diagram of FIG. 8, a voltage $V_{mod}$ across the transmitter light source (e.g. LED) 84 can be used as an indicator of a junction charge of the light source 84 and thus as an indicator of the light output level. The level of the voltage $V_{mod}$ can be used as direct feedback for a switching transistor 86 of the modulator, e.g., to control the switching the driving current accordingly. To achieve this, the voltage $V_{mod}$ is applied to a first input terminal of comparator 88. The second input terminal of the comparator 88 functions as a reference terminal to which a reference value (that corresponds e.g. to the upper/lower reflection limits $\phi_{URL}/\phi_{LRL}$ of FIG. 7) is applied. When the light source 84 is seen as a capacitor in parallel with a resistor, the switching transistor 86 charges and discharges the light source 84 to a level that corresponds to a bias input (e.g. offset value OS in FIG. 4) with or without the amplitude of the binary light output levels.

The reference value can be generated by a level shifter 82 (e.g. a summing operational amplifier with predetermined amplification) to which a binary data sequence OOK-BD to be transmitted by the light source 84 and a bias B (e.g. the offset OS to the minimum light output level of the light source 84) are applied at its two summing input terminals.

The output voltage of the level shifter 82 can thus be set to correspond to the upper/lower reflection limits $\phi_{URL}/\phi_{LRL}$. As a result, the switching transistor 86 can be controlled by the comparator 88 to switch off the driving current of the transmitter light source when a rising light output level reaches an upper reference value (e.g. the upper reversal limit $\phi_{URL}$) and to switch on the driving current when a falling light output level reaches a lower reference value (e.g. the lower reversal limit $\phi_{LRL}$).

In another embodiment, the drive control of the transmitter light source is configured to hold the light output level during two successive bits of the same binary value. This can be achieved by selecting an adequate duty cycle or duty ratio of the on and off times of the driving current between the sampling moments of the two successive bits.

In an example, the duty ratio to hold the level is not exactly 50%. If the duty is exactly 50%, the lower or minimum level $\phi 0$ of the light output level will drift upwards and the upper or maximum level $\phi 1$ of the light output level will drift downwards. Ultimately, after very long sequences, the upper and lower light output levels will reach a middle light level.

In a further embodiment, a memory (e.g. look-up table) that stores a predetermined number L of previous symbol value(s) (i.e. n−1, n−2, . . . n-L) of the binary data sequency may be used, where L can be greater or equal 1. Optionally, a memory effect for storing a previous value may be obtained by inductances of wiring into the transmitter light source.

The value(s) stored in the look up table or other type of memory can be used to determine a high-rate (i.e. sub-bit) switching pattern for the driving current during a bit duration, to be supplied to the transmitter light source, e.g., as indicated in the following exemplary table:

| Previous bit | New bit | High rate switching pattern during bit duration |
|---|---|---|
| 00 | 0 | 000011 |
| 01 | 0 | 100000 |
| 10 | 0 | 000111 |
| 11 | 0 | 000000 |
| 00 | 1 | 111111 |
| 01 | 1 | 111100 |
| 10 | 1 | 011111 |
| 11 | 1 | 111100 |

In the example of the above table, a high-rate driving current switching pattern "000011" is applied to the transmitter light source during a bit duration of a new bit value "0" if the two previous bit values had been "00". That is, the driving current is switched off during the first two thirds of the bit duration and is then switched on during the last third of the bit duration.

On the other hand, a high-rate driving current switching pattern "100000" is applied to the transmitter light source during a bit duration of a new bit value "0" if the two previous bit values had been "01". That is, the driving current is switched on during the first sixth of the bit duration and is then switched off during the remaining five sixths of the bit duration.

In another case, a high-rate driving current switching pattern "111111" is applied to the transmitter light source during a bit duration of a new bit value "1" if the two previous bit values had been "00". That is, the driving current is switched on during the entire bit duration.

Of course, only one or more than two previous bits may be used to determine the high-rate switching pattern for the driving current. Moreover, a shorter or longer switching pattern (i.e. less or more than six sub-periods of the bit duration) may be used.

Figure 9:
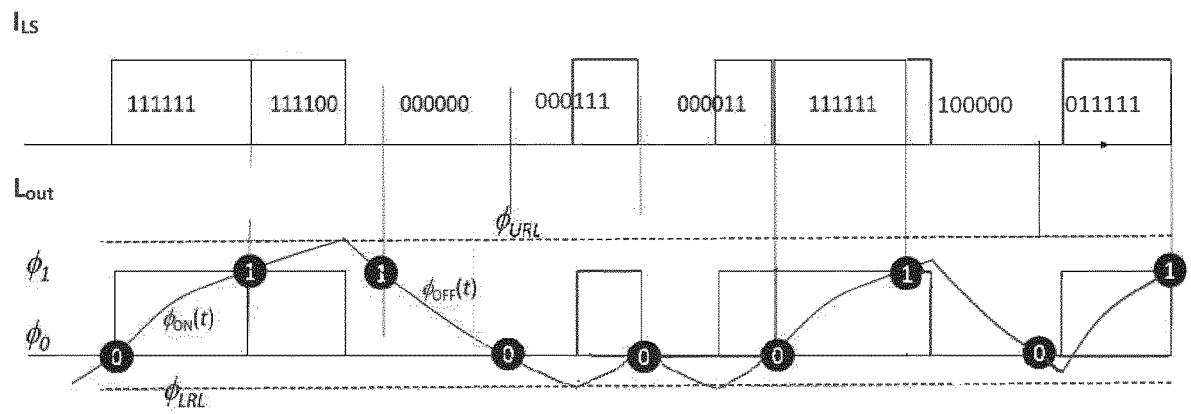
FIG. 9 shows schematically waveform diagrams of a light source current with high rate switching pattern and a resulting light output according to an embodiment.

FIG. 9 shows schematically waveform diagrams of a light source driving current ($I_{LS}$) with a high-rate switching pattern according to the above table and a resulting light output ($L_{out}$) as a function of time.

Thus, the driving current through the transmitter light source (e.g. LED) is controlled by the modulator (e.g. controller 18 and/or modulator circuit 14 of FIG. 1) using the look-up table shown above.

According to FIG. 9, a binary data sequence "11000101" is to be signaled by the transmitter light source. Based on the above table, the following sequence of eight high-rate switching patterns of the driving current need to be supplied to the transmitter light source to signal the above binary data sequence while ensuring that the light output level stays at the minimum resp. maximum light output levels $\phi 0$ and $\phi 1$ at the sampling moments (i.e. black circles in FIG. 9):

"111111" for the first bit value "1" with previous sequence "00";

"111100" for the second bit value "1" with previous sequence "01";
"000000" for the third bit value "0" with previous sequence "11";
"000111" for the fourth bit value "0" with previous sequence "10";
"000011" for the fifth bit value "0" with previous sequence "00";
"111111" for the sixth bit value "1" with previous sequence "00";
"100000" for the seventh bit value "0" with previous sequence "01"; and
"011111" for the eighth bit value "1" with previous sequence "10".

As can be gathered from FIG. 9, the high-rate switching patterns have been selected to meet the lower and upper reversal limits $\phi_{LRL}$ and $\phi_{URL}$ for the resulting light output level.

As already mentioned earlier, depending on the transmission quality of the optical channel (e.g. noise level), the receiver needs a certain distance between the received lower and upper light levels for the binary values "0" and "1". Thus, at poor signal-to-noise ratios (SNRs), the communication bit rate should be reduced to ensure that the energy per bit may is sufficient for reliable communication.

As an example, at longer communication ranges or distances where the received signal is weak, the bit rates used for communication may be selected below the 3 dB bandwidth of the transmitter light source. As a result, the transmitter light source has sufficient time to let its light output follow the on-off pattern of the driving current and the zero/one level is reached in a fraction of the bit duration, so that the received signal waveform resembles the waveform of the switching current and provides the highest reachable energy per bit.

Otherwise, at short communication ranges or distances where the received signal is strong enough to overcome the noise level, the swing or range (i.e. eye diagram opening) between the one and zero light output levels can be reduced. At very short communication ranges or distances, a main limitation is how fast the light output of the transmitter light source can increase from a 0 to 1 level or vice versa, so that the one and zero light output levels can be chosen just far enough apart to overcome the (low) noise level.

Hence, a rate adaptive transmission system can be provided, that is configured to maximize the communication bit rate based on the conditions or characteristics of the optical channel.

Hence, as shown as one of the options in FIG. 1, a feedback channel from the receiver 20 to the transmitter 10 can be used by the modulator (e.g. controller 18 and/or modulator circuit 14 of FIG. 1) to control the bit rate. If the selected bit rate is too high, the modulator may reduce the bit rate to reduce the bandwidth and thus increase the transmission quality (e.g. SNR per bit). Additionally, a larger swing or range of light output levels is achieved, as the on- or off-state of the driving current is maintained for a longer duration.

Otherwise, If the selected bit rate is so small that a sufficient transmission quality (e.g. SNR margin) is available, the modulator can increase the bit rate.

Accordingly, a reduction of the bit rate (or increase of the bit duration) allows the waveforms and light levels for the binary values "0" and "1" to deviate more, which makes the distance between the lower level and the upper level of the light output grow. Secondly, the noise bandwidth can be further reduced if the bit duration is made longer.

More specifically, at the sampling moment, the distance between two levels can be estimated as follows:

$$d=2\phi'T_b$$

where $T_b$ denotes the bit duration and the value of the parameter $\phi'$ depends on the history of the bit sequence (i.e. the bit values preceding the current bit values).

In a further embodiment, an operational point of the driving scheme may be automatically set. For a well-balanced number of zeros and ones of the binary data sequence to be transmitted via the light source, the operational point of the average light output automatically converges to a predetermined center value.

For a 50% duty cycling at very high bit rate (e.g. a symmetric square wave, on-off keyed), the average light output will not reach half of the maximum light output level $\phi1$ if the rise and fall times differ. An equilibrium occurs where the reduction of the light output during an off-period of the driving current exactly balances the growth of the light output during an on-period of the driving current.

A sufficient condition for a stable equilibrium (operating point) is that:
1) the rise curve $\phi_{ON}(t)$ of the light output is monotonously increasing (i.e. $\phi'_{ON}(t)>0$) and the second derivative is negative (i.e. $\phi''_{ON}(t)<0$), and
2) the fall curve $\phi_{OFF}(t)$ of the light output is monotonously decreasing (i.e. $\phi'_{ON}(t)<0$) and the second derivative is positive (i.e. $\phi''_{OFF}(t)>0$).

It can thus be assumed that if the bit stream is short-term balanced, i.e., if it has about same number of logical zeros and ones, the modulator will automatically set adequate levels for a stable operation of the proposed adaptive driving scheme (e.g. accelerated OOK).

For longer communication ranges or distance, the transmission quality (e.g. SNR) is lower. In such a case, the bit duration must be increased, so that the light output will follow the rise and fall curves for a longer period. Ultimately, it will the steady state levels. In other words, the adaptive driving system converges to a conventional OOK system if the transmission quality demands to utilize the full dynamic range of the LED light output range.

Various choices are possible for optimization.

In another embodiment, the upper limit of the radiation output is set at a maximum value that does not damage the LED. This can for instance be the consideration that after a very long period of high data levels (a long run of logical ones) the associated light power level does not excessively heat up the LED or similarly that this associated time-average data'-driven drive current DS does not exceed the absolute maximum rating of the LED current. Alternatively, when the data bit stream is encoded as a balanced-stream, that is, has an equal number of ones and zeros, and is balanced even over shorter time-windows, then the short-term-drive current DS is averaged during a short sequence one ones in the data sequence and can be up to two times the absolute maximum current. In such case of short term-balanced data, the upper limit of the radiation level can be up to twice the radiation level that would in long-term be a limit to LED light output.

In this embodiment, the lower radiation limit can be adapted as a trade-off between bit rate and achievable communication range. Setting the lower radiation just below the upper limit makes the system fast, but vulnerable to noise and limited in range. Setting the lower limit closer to zero, makes the system slower in bit rate, but more robust to noise and thereby able to support longer transmission ranges. In both regimes where the upper limit is chosen not to damage the LED, is it likely that the fall curve imposes/ defines the shortest bit duration (and thus restricts the bit rate). If on the other hand, the rise curve would impose/ define the shortest bit duration (and thus restricts the bit rate), then it would be attractive to consider lowering both upper and lower limit of the radiation output, maintaining the distance between upper and lower radiation limit, but allowing faster transitions.

Optionally, when one does not pursue the fastest possible transmission rate, but rather a reasonable bit duration, this results in the following design rule for the positive drive current. If the maximum non-damaging light output level of the light source is known and maximum range is known (thus the required distance between high and low light levels) and the required top bit rate (thus the shortest bit duration), the positive drive current needs to be just large enough to rise the light level from the low value to the high value, with the shortest bit duration.

As there is a physical (e.g. thermal) limit to the maximum light level, one can design the downward current value, for the most demanding range and bit rate combination. At this range, the distance between received upper and lower light level must be adequate to be robust against noise. This sets the lower limit (lower limit should be at most equal to upper limit minus distance). The negative drive current then should be low enough (strong enough negatively) to reach the minimum light level within the shortest bit duration.

In another embodiment with simplified electronics, the negative current is implemented as a short circuiting of the light radiation source. This short circuit depletes the LED junction capacitance faster than by an open circuit, i.e., faster than if the junction is only depleted by internal hole electron recombination (which may become slow if the LED is already partially discharged). In such a system, a minimum distance between the lower and the higher light level is required by the receiver noise level and path loss.

When considering optimization for power at a bit-rate, the lower light level, and by adding the required distance also the higher light level, are chosen such that the fall curve during short-circuiting reduces from the high light level to the low light level sufficiently fast to support the bit rate. This procedure results in a well-chosen upper and lower light limit. Then the pull-up positive current is chosen high enough, such that the rise time from the low light level to the high level is equally fast or faster than before mentioned fall time.

Throughout the above the focus was on the use of on/off keying to realize a two-level radiation output range. However, the approach as described herein is not necessarily limited to a two-level scheme. When the reduced radiation output range is sufficient to accommodate more levels, it may be possible to, in a like manner, implement a three-level approach wherein on/off keying is applied to realize three distinct levels, for example a first level "0" corresponding with the lower target level, a third level "2" corresponding to the upper target level and a second level "1" corresponding to the midpoint between the lower and upper target level.

When implementing a transmission scheme employing a three-level radiation output, the reduced radiation output range needs to be sufficient to enable the receiving device to discern between the three-levels at the receiver side. As a result, the spacing between the lower and upper target level for a three-level scheme will thus require a larger spacing than required for a two-level scheme. In addition, the timing of such a multi-level encoding will be determined by the largest step size, which will correspond to the slowest level change. This is from either the upper radiation level to the lower radiation level or the lower radiation level to the upper radiation level. When using such a three-level scheme, the transmission quality needs to capture the transmission quality of the slowest transition, so that the adaptive OOK modulator can set the reduces radiation output range in a manner that would allow proper reception. In addition, as the reduced radiation range needs to accommodate all levels and thus will generally require a larger output, range, the amount of room for variation in timing will be reduced.

Besides using multiple light output levels, it may also be beneficial to implement multiple, for instance three, driving current levels. This can also be beneficial if only two light levels are used. In a simple example, 1) a pull-up current is used to support a transition from a low light level to a high light level 2) a pull-down current is used to support a transition from a high light level to a low light level 3) and idle current (Light source is an open circuit) to maintain a light level 1 to 1 transition or to maintain a low light level (0 to 0). For the third case short spurts (during a sub bit interval) of a current are needed to maintain the charge level while the light source loses holes and electronics due to photonic recombination. Such a tri-level driver, with idle state, consumes less power and causes less EMC radiation.

In a still further embodiment, a further multi-level system is presented. This embodiment can prevent restrictions on the light output range. Although it avoids ISI, it limits the difference between the two binary levels (0 and 1) of the light output. During sustained periods of same binary values (ones or zeros) of the input data sequence, the further separation of light output levels provided by the multi-level system can be used to improve the "distance" between successive sampling values.

Figure 10:
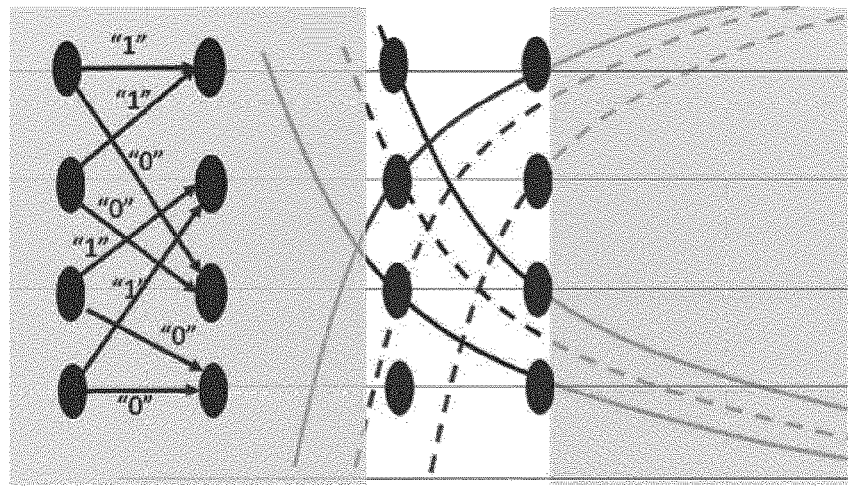
FIG. 10 shows schematically a trellis coded modulation scheme and light output rise and fall curves of a light source according to an embodiment.

FIG. 10 shows schematically a multi-level trellis coded modulation scheme (left portion of FIG. 10) and light output rise and fall curves (right portion of FIG. 10) as fastest possible level transitions. FIG. 10 reveals how the additional reachable distance provided by the multi-level system can be advantageously used in a controlled way.

In the example of FIG. 10, a four-level output signal of the transmitter light source can be created by suitable on-off switching of the driving current of the light source. The modulator (e.g. controller 18 and/or modulator circuit 14 of FIG. 1) targets four levels, but due to finite on and off speeds determined by the rise and fall curves $\phi_{ON}(t)$, $\phi_{OFF}(t)$, not all transitions are feasible. This results in an encoded "trellis" of the signals. In contrast to the conventional trellis error correction codes, the transitions in the trellis of the proposed multi-level driving mode are chosen such that these fit with the low-pass limitations of the transmitter light source, i.e., to ensure that any transition used matches with the rise and fall curves of the transmitter light source.

More specifically, depending on the determined transmission quality (e.g. SNR) of the optical channel, a certain distance between the light output levels must be adhered to ensure a sufficiently low error rate (e.g. BER) at the receiver.

The choice of the distances between the e.g. four light output signal target levels can be made equidistant to provide highest robustness against noise that may influence the light output level detected at the receiver. The distance between two points may be selected to ensure adequate quality of transmission (e.g. BER). If the quality is too low, larger distances between the target light output levels may be needed, which can be achieved by reducing the bit rate. The total set of target levels may be lifted, such that the lowest target light output level is sufficiently above zero to be discriminated from the noise level, where the transmitter response is fast (similar to the above two-level scheme that should be sufficiently above the lowest reachable light output level).

In the example of FIG. 10, a trellis coded modulation is used, where the transitions are designed in accordance with the maximum possible step size that the rise time of the low-pass characteristic of the transmitter light source allows, taking into account the limitations of the (enlarged) driving current. The trellis coded modulation (e.g. as proposed by Ungerboeck [https://en.wikipedia.org/wiki/Trellis_modulation]) was originally intended for telephone lines with a hard bandwidth limitation. In contrast to this, semiconductor light sources (e.g. LEDs) have a relatively gentle roll-off above their 3 dB bandwidth, which can be described as a first-order roll off. It is therefore proposed to push the bit rate above the 3 dB bandwidth of the transmitter light source. Secondly, semiconductor light sources (e.g. LEDs) exhibit non-linearities, e.g. in form of different rise and fall times, and a bandwidth that depends on the signal level. The choice of output light levels of the multi-level system and the paths between these output light levels are proposed to be designed based on the response speed of the transmitter light source and what can be achieved by switching a driving current larger than the one required for reaching a steady-state of the transmitter light source or than the one that would be suitable if the transmitter light source were predominantly (or exclusively) modulated within its 3 dB bandwidth.

In case of very high bit rates, it becomes clear that we the transmitter light source is driven as if it were an integrating channel, i.e., such as if a (non-linear) capacity would be charged and discharged.

In an example, the rise and fall curves of the transmitter light source may be used to determine the relation between the first and third level (1-to-3, largest rise from slowest region) and between the fourth and second level (4-to-2, largest fall from highest level), respectively. The bit rate and thus the duration of every symbol may be set to just allows the light output signal to reach these output light levels.

In another example, the set of all levels may be lifted to ensure that these 1-to-3 and 4-to-2 rise/fall times become identical.

More generically, the levels of the multi-level system may be selected such that two-step transitions impose an at least substantially identical limitation to the required time interval between two symbol sampling moments as one-step transitions. In this example, the two-step transitions 1-to-3 and 4-to-2 are more limiting than the one-step transitions 3-to-4 and 2-to-1. However, in another regime, e.g. if the communication range is relatively long such that the system tries to make the largest possible swing and thus goes relatively deep into the tails of the fall curve, the latter two (one-step) transitions may become more limiting and may determine the maximally possible bit rate. The trellis track may be followed by using only two current levels. The driving current may be used during the full bit period to make the largest steps for instance from the first level to the third level or from the fourth level to the second level, while for smaller steps (e.g., from the second level to the third or from the third level to the fourth level) some alternations or patterns of the on and off current may be used. This all allows a power efficient driving of the transmitter light source, a simple detection, and an accelerated bit rate.

At any time, the transmitter has only two options: transmit a first binary value (e.g. zero) or a second binary value (e.g. one). It depends on the current state (e.g. current output light level) what steps can be taken within the physical constraints imposed by the response of the transmitter light source and the transmission quality. The proposed multi-level scheme acknowledges that the step size that is feasible within one bit time depends on the current state of the multi-level system. Triple jumps, i.e., steps 1 to 4 and 4 to 1 may be impossible, but also double steps 3 to 1 and 2 to 4 may take more time than allowable, as these are "deeper in the tail of the off and on curve" of the transmitter light source. However, the double jumps 1 to 3 and 4 to 2 may become feasible in a faster range of the rise and fall curves of the transmitter light source. By walking along a constrained path over the trellis, the range of output light values of the transmitter light source can be optimally used based on the current light output state and transmission quality and an error correction coding can implicitly be applied.

In the example of FIG. 10, the transitions 4-to-2, 3-to-4 and 2-to-1 impose a somewhat similarly sized limitation on the bit duration, as indicated by the solidly drawn rise/fall curves of the transmitter light source. Nonetheless, if transitions in one direction, as for instance 4-to-2 and 2-to-1 in FIG. 10, are the only limitation, the choice of light levels can be optimized further. As the rise and fall curves of FIG. 10 show, all upward transitions within the trellis can be made in shorter time. Hence, all light levels could be uplifted by some vertical shift. Then, the fall time from the fourth to the second level decreases, but also the upward light levels can be changed faster. An optimum setting point is achieved when the slowest upward transition takes the same time as the slowest downward transition.

For an equidistant distance of four levels, the two degrees of freedom are the time distance between the sampling moments and the level distance between the light levels. The former may be determined by the transmission quality (e.g. SNR and BER), while the latter may be set by minimizing the slowest transition time between light levels. Alternatively, the second and third levels may be placed closer together, thus shifting the first and third levels separately from the second and fourth levels. As a further option, the second and third levels may be combined to a common level.

The decoding operation at the decoder (e.g. the decoder 26 of FIG. 1) of the receiver may be based on a binary slicing operation.

In an example, the decoder may place a slicer between the two middle levels of the multi-level light output. Then, it can be observed that for a bit value "1", the light output is either at the third or fourth level, while for a bit value "0", the light output is either at the first or second level.

In another example, decoding may be achieved by using a one-tap memory for storing the previous bit value. If the previous bit value was "1", the receiver needs to detect either the second level or the fourth level to determine a bit value "0" or "1", respectively. The slicing level for the new bit can be at (or near) the third level. Thus, if the new bit value is "1", the transmit level is the fourth level, and if the new bit value is "0", the transmit level is the second level.

Furthermore, if the previous bit value was "0", the slicer level for the new bit value can be at (or near) the second level. Thus, if the new bit value is "1", the transmit level is the third level, and if the new bit value is "0", the transmit level is the first level.

In a further example, trellis decoding at the receiver may be achieved by slicing all levels of the received light signal in a first step. In the example of FIG. 10, four levels are distinguished. An example of the decoder (e.g. the decoder 26 of FIG. 1) may be the Viterbi decoder. It may take a final decision about the received bit value at a later stage after the bit has been received, as future bits provide further information required for determining the bit value.

In the above embodiment, the sampling moment can be determined by tracking a middle level of the received light and searching for a time position with the largest eye opening (i.e. largest distance between lower and upper light levels). An oscillator (e.g. a voltage-controlled oscillator (VCO)) may be used to generate a clock signal used to control the sampling moments of the incoming light signal (e.g. at instants slightly earlier or later than the detected largest eye opening).

As a generalization of the two current level trellis as presented herein above in FIG. 10, in more advanced implementations, a trellis over more than two points may be deployed. In such an implementation, the transmitter follows a path in which the step size is constrained. In every step the light level only goes up or down by only one level. An exception is made at the boundaries of the trellis (upper/lower level). Here a step size zero is used for one of the two possible bit values, while for the alternative bit value, a step size of either one or two is implemented (depending on whether or not the receiver can discern between the two adjacent (or upper) levels. The latter will generally depend on the properties of the semiconductor radiation source. In contrast, in the above example of a trellis with 4 levels, a step size of either 0 or 2 (but not 1) is taken at boundaries.

For example, when using 7 light levels. The following transitions may be allowed: 2-to-1, 2-to-3, 3-to-2, 3-to-4, 4-to-3, 4-to-5, 5-to-4, 5-to-6, 6-to-5, 6-to-7, plus the boundary steps 1-to-1, 1-to-3, 7-to-7, 7-to-5. Alternatively, the latter set of boundary steps can be chosen as 1-to-1, 1-to-2, 7-to-7, 7-to-6.

In the latter case, the system must take precautions to prevent that the bit duration goes below the time needed to make the slowest transition out of the complete set of possible transitions. In addition, it may be necessary to, during transitions that can be achieved faster, control the driving current (e.g., by switching the current in polarity or to idle, or delay the onset of the current) so as not to overshoot the target.

To summarize, a binary signaling scheme for a semiconductor radiation source has been described, where the driving current and thus also the radiation output level is modulated by switching the driving current on and off. However, the modulation of the driving current is adapted to not wait for the radiation response to follow the complete rise or fall curve but to switch between two (or a larger number of) selected radiation output levels. During prolonged sequences of zeros (or ones), the driving current is switched to keep the radiation output level between a certain minimum and maximum level. This range of radiation output levels is adaptively selected in accordance with characteristics of the driving current, the optical transmission channel, the radiation source and/or the radiation detector.

While the invention has been illustrated and described in detail in the drawings and foregoing description, such illustration and description are to be considered illustrative or exemplary and not restrictive. The invention is not limited to the disclosed embodiments. The proposed accelerated keying concept can be applied to other types of optical wireless networks and with other types of access devices, modems and transceivers. In particular, the invention is not limited to LiFi-related environments, such as the ITU-T G.9961, ITU-T G.9960, and ITU-T G.9991 network environment. It can be used in visible light communication (VLC) systems, IR data transmission systems, G.vlc systems, OFDM-based systems, connected lighting systems, OWC systems, and smart lighting systems.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. The foregoing description details certain embodiments of the invention. It will be appreciated, however, that no matter how detailed the foregoing appears in the text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated.

A single unit or device may fulfill the functions of several items recited in the claims. The mere fact that certain measures are recited in mutually different dependent claims does not indicate that a combination of these measures cannot be used to advantage.

The described procedures like those indicated in FIG. 3 can be implemented as program code means of a computer program and/or as dedicated hardware of the receiver devices or transceiver devices, respectively. The computer program may be stored and/or distributed on a suitable medium, such as an optical storage medium or a solid-state medium, supplied together with or as part of other hardware, but may also be distributed in other forms, such as via the Internet or other wired or wireless telecommunication systems.

The invention claimed is:

1. A transmitter for generating a radiation signal in an optical communication system, the transmitter comprising:
   an apparatus for driving a semiconductor radiation source, the apparatus comprising:
   a modulator configured to:
   modulate a driving signal supplied to the radiation source with a data sequence to generate at least two levels of a driving current through the radiation source that define a radiation output range of the radiation source between an upper radiation output level and a lower radiation output level during transmission of the data sequence; and
   a controller configured to:
   determine a transmission quality of the radiation output at the transmitter using at least one of: a feedback signal indicative of the radiation output level of the radiation source and a feedback information received from a receiving end of the radiation output;
   determine an upper target level and a lower target level defining a reduced radiation output range based on the transmission quality of the radiation output; and
   adaptively control the modulator to control the driving current and switch the driving current at a timing determined by the reduced radiation output range between a predetermined upper target level and a predetermined lower target level.

2. The transmitter of claim 1, wherein the controller is configured to maintain the upper target level and the lower target level by switching the driving signal at a higher rate than the rate of the data sequence.

3. The transmitter of claim 2, wherein the data sequence is a binary data sequence, and wherein the controller is configured to control the modulator to apply a binary switching pattern as the driving signal during a bit duration of the binary data sequence, and wherein the binary switching pattern is determined by a combination of a current bit value and at least one previous bit value of the binary data sequence.

4. The transmitter of claim 1, wherein the transmission quality of the radiation output is based on the feedback signal and the modulator is configured to compare the feedback signal with a lower reversal limit and an upper reversal limit and to switch off the driving signal when the feedback signal has reached the upper reversal limit and/or to switch on the driving signal when the feedback signal has reached the lower reversal limit.

5. The transmitter of claim 1, wherein the modulator is configured to apply a short-circuit or a negative driving current to the radiation source during an off-state of the driving signal.

6. The transmitter of claim 1, wherein the data sequence is a binary data sequence, and wherein the controller is configured to control the modulator to insert sub-bit periods or patterns of a different logical value than a current logical value of the binary data sequence into the driving signal to achieve the upper target level or the lower target level at a sampling moment.

7. The transmitter of claim 1, wherein the controller is configured to select the upper target level and the lower target level such that a rise time of the radiation output from the lower radiation output level to the upper radiation output level equals a fall time of the radiation output from the upper radiation output level to the lower radiation output level.

8. The transmitter of claim 1, wherein the modulator is configured to modulate the driving signal to generate more than two radiation output levels, wherein transitions in trellis of a multi-level driving mode are adapted to rise and fall curves of the radiation source.

9. An optical communication system comprising a transmitter as claimed in claim 1 and a receiver for receiving the radiation signal generated by the transmitter.

10. The system of claim 9, wherein the receiver is configured to detect a transmission quality of the radiation signal and to feed-back to the transmitter information about the detected transmission quality to control the radiation output range of the radiation source.

11. A method of driving a semiconductor radiation source at a transmitter for generating a radiation signal in an optical communication system, the method comprising:

modulating a driving signal supplied to the radiation source with a data sequence to generate at least two levels of a driving current through the radiation source that define a radiation output range of the radiation source between an upper radiation output level and a lower radiation output level during transmission of the data sequence;

determining a transmission quality of the radiation output at the transmitter, using at least one of a feedback information received from a receiving end of the radiation output and a feedback signal indicative of the radiation output level of the radiation source;

determining an upper target level and a lower target level defining a reduce radiation output range based on the transmission quality of the radiation output; and adaptively controlling the driving current and switching the driving current at a timing determined by a reduced radiation output range between the upper target level and the lower target level.

12. A non-transitory computer readable medium comprising instructions, the instructions when executed by a controller device cause the controller device to perform the method of claim 11.

* * * * *